US011130369B2

(12) United States Patent
Hugues (10) Patent No.: US 11,130,369 B2
(45) Date of Patent: Sep. 28, 2021

(54) MAGNETICALLY ALIGNABLE SWIVEL CASTER

(71) Applicants:PENN ELCOM CORPORATION, Tortola (VG); PENN ELCOM LTD., East Sussex (GB)

(72) Inventor: Thierry Hugues, Istres (FR)

(73) Assignees: PENN ELCOM CORPORTION, Tortola (VG); PENN ELCOM LTD., East Sussex (GB)

(*) Notice: Subject to any disclaimer, the term of this patent is extended or adjusted under 35 U.S.C. 154(b) by 0 days.

(21) Appl. No.: 16/854,487

(22) Filed: Apr. 21, 2020

(65) Prior Publication Data

US 2020/0316990 A1 Oct. 8, 2020

Related U.S. Application Data

(63) Continuation of application No. 16/075,383, filed as application No. PCT/EP2017/052409 on Feb. 3, 2017, now Pat. No. 10,661,605.

(30) Foreign Application Priority Data

Feb. 4, 2016 (EP) ..................... 16154243

(51) Int. Cl.
*B60B 33/02* (2006.01)
*B60B 33/00* (2006.01)

(52) U.S. Cl.
CPC .......... *B60B 33/028* (2013.01); *B60B 33/006* (2013.01); *B60B 33/0068* (2013.01)

(58) Field of Classification Search
CPC .. B60B 33/028; B60B 33/006; B60B 33/0068
See application file for complete search history.

(56) References Cited

U.S. PATENT DOCUMENTS 3,031,038 A * 4/1962 Chait .................. B60B 33/0094
188/111
4,054,965 A * 10/1977 Vig ......................... B60B 33/02
16/35 D
(Continued)

FOREIGN PATENT DOCUMENTS

DE 20 2015 101 804 U1 8/2016
EP 3 081 391 A1 10/2016
(Continued)

OTHER PUBLICATIONS

International Preliminary Report on Patentability of PCT/EP2017/052409 dated Aug. 16, 2018.

*Primary Examiner* — Jeffrey O'Brien
(74) *Attorney, Agent, or Firm* — Dickinson Wright PLLC (57) ABSTRACT

A swivel caster (1) including a support plate (2) for connection to a container, and including a caster mount (3) having a caster (6) rotatable about a horizontal rotation axis (H). The caster mount (3) is connected to the support plate (2) rotatable about a vertical rotation axis (V). At least one first magnet (15a) is connected to the caster mount (3) and at least one second magnet (15b) is connected to the support plate (2). The magnets (15a, 15b) are magnetized and disposed so as to be mutually parallel including a gap in such in an alignment of the caster mount outside a defined basic alignment (G) of the caster mount (3) the magnets (15a, 15b) interact such that the caster mount (3) swings into basic alignment (G). The caster mount (3) has a cover plate (11) which collectively with the saucer (9) of the support plate (2) and with the mounting plate (7) encloses an intermediate space for the magnets (15a, 15b). The cover plate (11) has two legs (17a, 17b) which extend in the direction of the horizontal rotation axis (H) of the caster (6). Each leg (17a, (Continued)

17*b*) has a free end (18*a*, 18*b*) remote from the cover plate (11) is connected to the caster mount (3) via a connector.

14 Claims, 7 Drawing Sheets

(56) References Cited

U.S. PATENT DOCUMENTS

| | | | | |
|---|---|---|---|---|
| 9,649,881 | B2* | 5/2017 | Warncke | B60B 33/006 |
| 9,908,366 | B2* | 3/2018 | Bruno | B60B 33/006 |
| 2016/0031264 | A1* | 2/2016 | Bruno | B60B 33/00 16/39 |

FOREIGN PATENT DOCUMENTS

| | | |
|---|---|---|
| JP | H05-254306 A | 10/1993 |
| WO | 2004/020225 A1 | 3/2004 |
| WO | 2005/011429 A2 | 2/2005 |

\* cited by examiner

MAGNETICALLY ALIGNABLE SWIVEL CASTER

CROSS-REFERENCE TO RELATED APPLICATIONS

This application is a continuation of U.S. patent application Ser. No. 16/075,383, filed Aug. 3, 2018, which is a 35 U.S.C. § 371 national phase application of PCT International Application No. PCT/EP2017/052409, filed Feb. 3, 2017, which claims the benefit of priority under 35 U.S.C. § 119 to European Patent Application No. 16154243.6, filed Feb. 4, 2016, the contents of which are incorporated herein by reference in their entirety.

FIELD OF THE INVENTION

The invention relates to a swivel caster, including a support plate for connection to a container, and further including a caster mount having a caster which is rotatable about a horizontal rotation axis, wherein the caster mount is connected to the support plate so as to be rotatable about a vertical rotation axis, wherein at least one first magnet is connected to the caster mount and at least one second magnet is connected to the support plate. The magnets are magnetized and disposed so as to be mutually parallel including a gap in such a manner that in an alignment of the caster mount outside a defined basic alignment of the caster mount the magnets interact in such a manner that the caster mount swings into basic alignment, wherein the caster mount has a cover plate which collectively with the saucer of the support plate and collectively with the mounting plate encloses an intermediate space for the magnets.

BACKGROUND

Swivel casters are non-driven support wheels which are capable of automatic self-alignment in relation to the current direction of movement. They are used, for example, for office chairs, wheel chairs, and shopping trolleys.

A swivel caster of the type mentioned at the outset may also be used for transport containers. To this end, the swivel caster is attached to a container wall on a lower side of the container that faces the floor. If and when a container is to be stacked onto an upper side of another container, the swivel caster is introduced into a clearance on the upper side. The swivel caster is held in a form-fitting manner in the clearance, and is locked against pivoting and also against rolling up to a specific angle of inclination of an upper side of the container. In order for the casters to be able to be introduced into the clearance, the casters have to be inwardly pivoted to a specified alignment. In this alignment it ought to be possible for a stop which is attached to the caster to be actuated, so that the container given certain circumstances does not roll out of the clearance, for example when said container during transport is under the influence of an external force. Since pivoting of the swivel caster has to be performed manually, stacking of the boxes is time consuming and moreover associated with a certain risk of injury.

DE 20 2015 101 804 U1 discloses a swivel caster with the aforementioned properties. The swivel caster includes a cover plate which bears on the mounting plate of the caster mount on the periphery by way of two mutually opposite webs. In this way, the cover plate is connected to the support plate within the caster mount adjacent to the rotation mechanism for a rotation around the vertical axis. Due to the limited space within the caster mount, the possibilities to connect the support plate to the cover plate are restricted. Equally, the caster mount provides a restricted space for rotation means. Furthermore, the connection of the mounting plate is difficult.

The present invention is based on the object of providing a swivel caster in which the disadvantages described above may be avoided, and in which in particular to provide more space for the rotation mechanism within the caster mount while maintaining the cover plate be adequately fixed to other components of the swivel caster. Moreover, it is the object of the invention to provide a swivel caster in which the cover plate can be fixed in an easier way.

The object is achieved according to the invention by the features described below and illustrated by the appended figures.

SUMMARY

The swivel caster according to the present invention is characterized in that the cover plate has two legs which extend in the direction of the horizontal rotation axis of the caster, wherein each leg in each case at that free end thereof that is remote from the cover plate is connected to the caster mount via a connector. As the cover plate is connected to the caster mount in the region of the horizontal rotation axis of the caster, there is more space for the rotation mechanism providing a rotation around the vertical axis. The cover plate can be easily fastened together with the caster to the caster mount, preferably by a single connector. As the cover plate can be connected together with the caster, the structure of the swivel caster is simplified, too. Furthermore, using the steady connector of the caster has the advantage that the cover plate is connected to the caster mount in a stable way.

The swivel caster automatically swings into a specific basic alignment, so that the containers may be stacked with a significantly lower temporal effort than before and with a reduced risk of injury.

The magnets here are disposed in relation to one another and configured in such a manner that the magnets in the basic alignment of the caster mount attract one another at maximum force and following rotation, in particular by 180° in a common plane, repel one another at maximum force. Magnetizing in this manner shortens the time for the caster to swing in.

In one advantageous embodiment of the invention, in basic alignment of the caster mount the first magnet on that side thereof that faces the second magnet and extends so as to be transverse to the vertical rotation axis of the caster mount has a north pole and a south pole in contact therewith, and the second magnet on that face thereof that faces the first magnet and extends so as to be transverse to the vertical rotation axis has a north pole, which is parallel with the vertical rotation axis and opposite to the south pole of the first magnet, and a south pole which is parallel with the vertical rotation axis and opposite the north pole of the first magnet. This arrangement of the magnets makes it possible for the swivel caster to be able to swing in to a single desired alignment within a few seconds.

In particular, each magnet is formed from in each case two part-magnets which are disposed beside one another so as to be perpendicular to the vertical rotation axis, wherein the disposal of the north pole and of the south pole of the part-magnets extends in the direction of the vertical rotation axis, and a part-magnet in relation to the other part-magnet is disposed so as to be rotationally offset by 180° about an axis which is perpendicular to the vertical rotation axis. On account thereof, no specially manufactured magnets have to be used, so that the swivel caster may be manufactured in a cost-effective manner.

In one preferred embodiment of the invention it is provided that the support plate is fixedly connected to a saucer, and a mounting plate forms a base area of the caster mount, wherein the mounting plate is rotatably mounted between the saucer and the support plate. A design embodiment of this type enables that the bearing is disposed to as to be protected from external influences.

In particular, the first magnet is disposed on a side of the cover plate that faces the intermediate space, and the second magnet is disposed on a side of the saucer of the support plate that faces the intermediate space. Here, there is a gap which is enclosed between the two magnets. This feature facilitates assembly or disassembly, respectively, for example for maintenance works.

Furthermore, a stop for the swivel caster is preferably provided, wherein the stop in a blocked position interacts in a form-fitting and/or force-fitting manner with the caster and with the rotary joint which connects the caster mount and the support plate so as to be rotatable about the vertical rotation axis, and in an unblocked position releases the caster and the disc joint. Thus, the stop during stacking interacts with the clearance, since both collectively block the caster from pivoting, using dissimilar mechanisms. Additionally, the stop blocks the caster from moving about the horizontal rotation axis.

BRIEF DESCRIPTION OF THE DRAWINGS

Further advantageous design embodiments of the invention may be derived from the following description of the figures. In the figures.

In the various figures of the drawing identical parts are always provided with identical reference signs.

DETAILED DESCRIPTION

In the context of the following description it is claimed that the invention is not limited to the exemplary embodiments and thus not to all or a plurality of features of combinations of features described; rather each individual part-feature of the/each exemplary embodiment may also be relevant to the subject matter of the invention individually and also in combination with arbitrary features of another exemplary embodiment when detached from all other part-features described in the context therewith.

Figure 1:
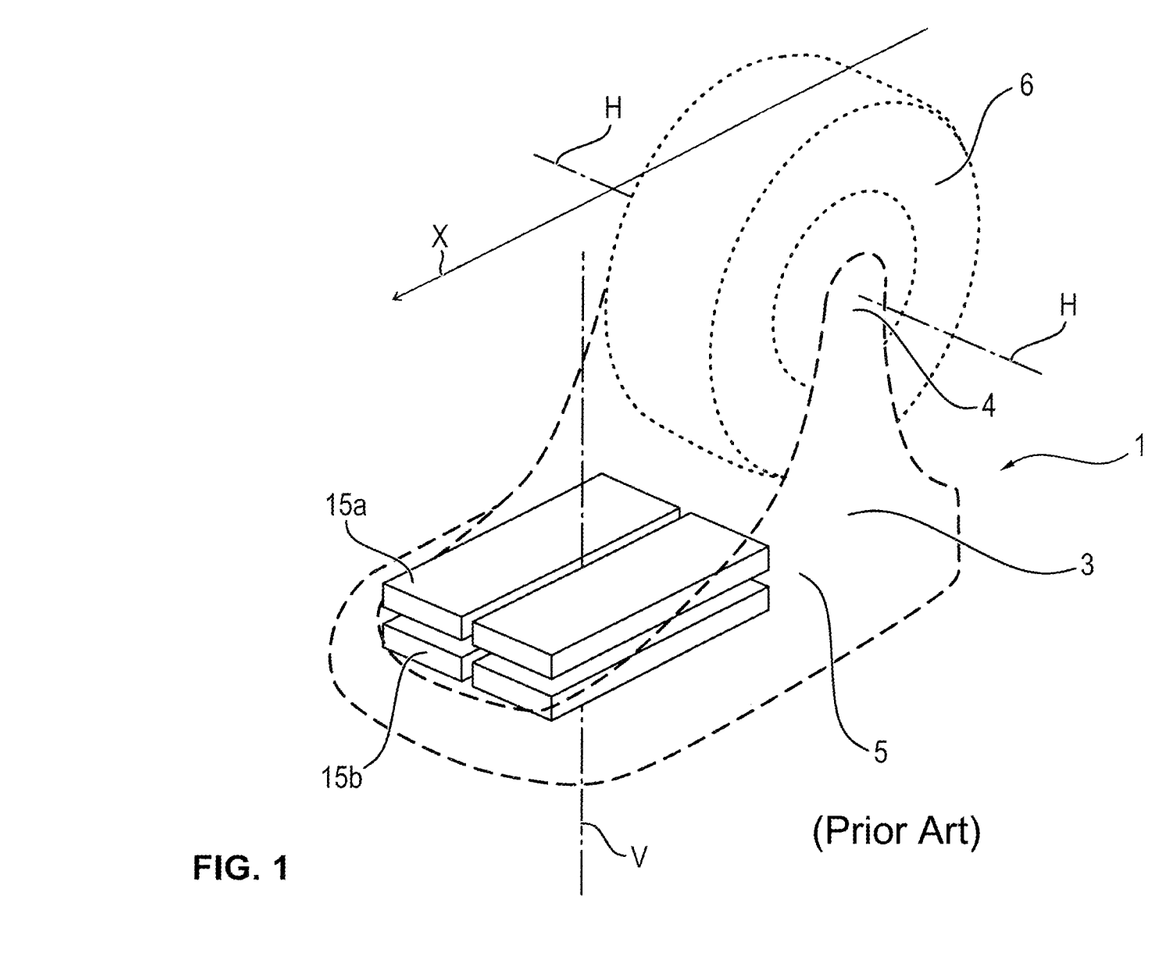
FIG. 1 shows a schematic illustration of a swivel caster in accordance with the prior art.

A prior art swivel caster 1 is schematically illustrated in FIG. 1. The swivel caster 1 includes a support plate 2 which is rotatably connected to a caster mount 3, for example via a rotary joint, for example in the form of a disc joint. The support plate 2 here may be configured so as to be integral with a container, or be fastened to the latter via a connector. A caster 6 which is movable about a horizontal rotation axis H is fastened to the caster mount 3. The horizontal rotation axis H runs parallel with a plane of extent of the support plate 2. The caster mount 3 in relation to the support plate 2 is rotatable about a rotation axis which forms a quiescent rotation point and which runs in a transverse manner to the horizontal rotation axis H of the caster. The former rotation axis will be referred to as the vertical rotation axis V hereunder, and forms a normal of the plane of extent of the support plate 2. The caster mount 3 in relation to the support plate 2 is preferably configured so as to be rotatable by a full rotation, that is to say by 360°, about the vertical rotation axis V.

In particular, both the horizontal as well as the vertical rotation axis V run through the caster mount 3, wherein the caster mount 3 in particular encloses those components which are involved in the event of rotation about the vertical rotation axis V. The caster mount 3 in particular includes a housing having an axle portion 4 for rotatably fastening the caster 6, and a joint portion 5 in which the caster mount 3 together with the support plate 2 forms a disc joint. The disc joint is preferably configured in an internal region between two arms which connect the joint portion and the axle portion. The internal region is furthermore delimited by a mounting plate 7 which is interdisposed between the caster 6 and the support plate 2, so as to be along the vertical rotation axis V. In particular, the mounting plate 7 forms a base area, that is to say the base of the caster mount 3, which is directly involved in the movement in the disc joint.

Figure 2:
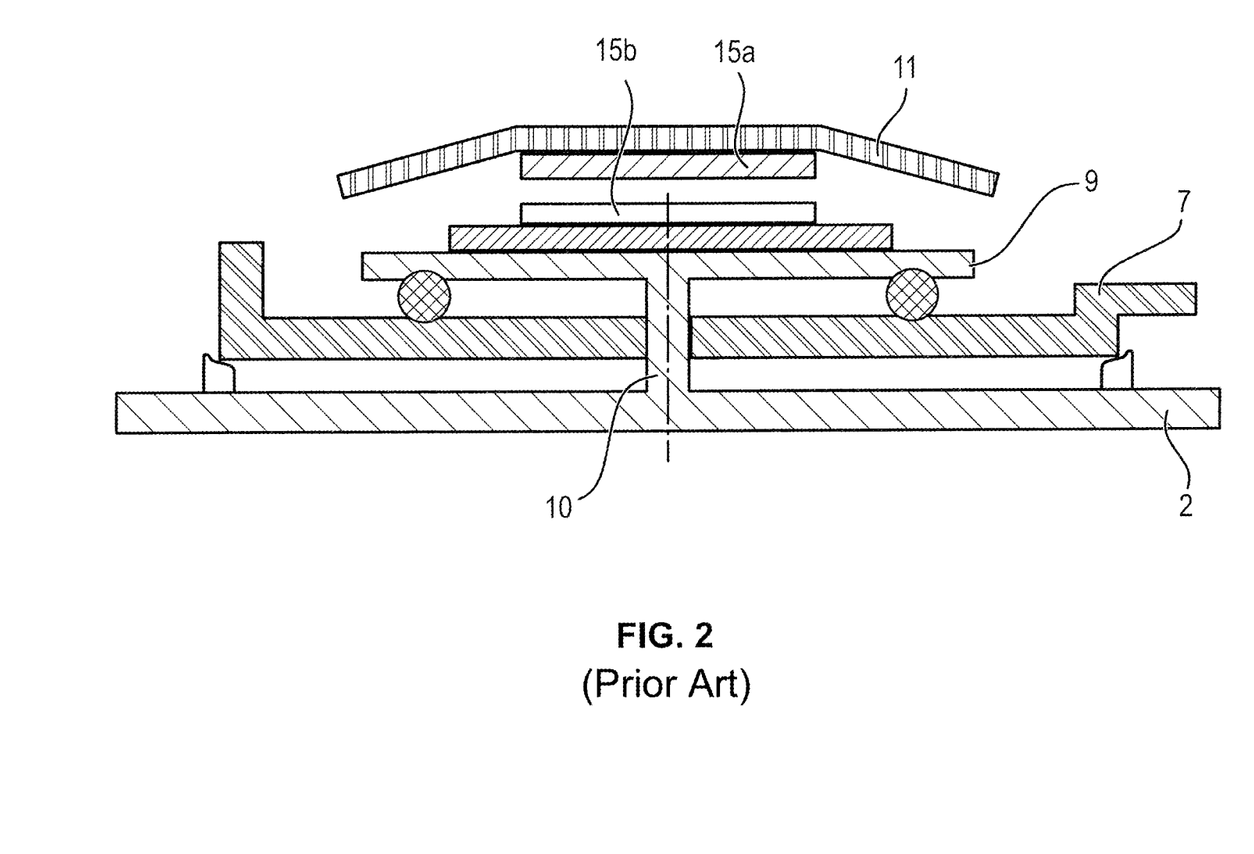
FIG. 2 shows a cross section through a part-region of a swivel caster in accordance with the prior art.

A cross section of components which are enclosed by the joint portion 5 of the caster mount 3 is illustrated in FIG. 2 in accordance with the prior art. Here, the mounting plate 7 is preferably interdisposed between a saucer 9 and the support plate 2 and together with the saucer 9 and the support plate 2 forms part of a bearing which enables the caster mount 3 in relation to the support plate 2 to rotate about the vertical rotation axis V. It is possible here, for example, that the saucer 9, the support plate 2, and the mounting plate 7 are part of a ball bearing, as is illustrated in FIG. 2, for example. In the exemplary embodiment the saucer 9 is connected in a non-movable manner to the support plate 2 via a bolt 10 which runs parallel with the vertical rotation axis V and encloses the vertical rotation axis V.

Figure 4A:
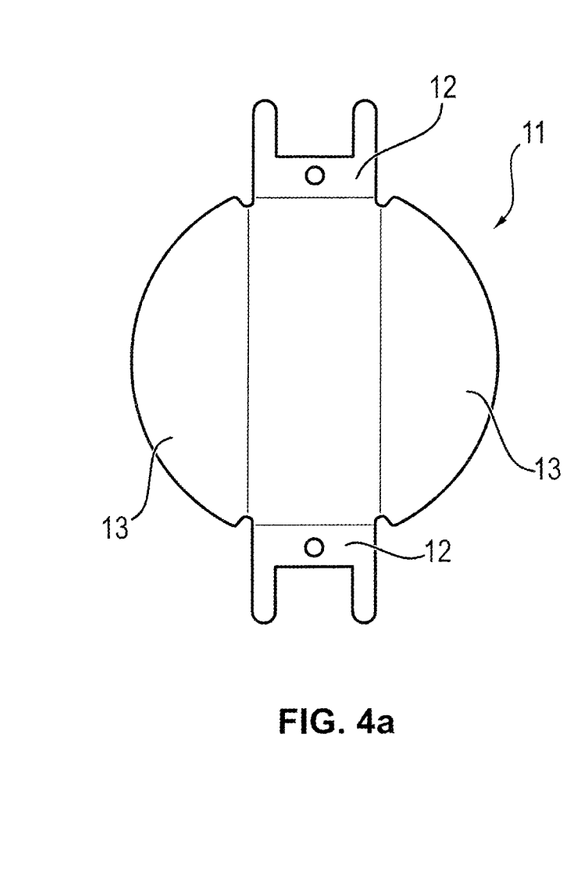
FIG. 4a shows a first view of a cover plate in accordance with the prior art in accordance with the prior art.
Figure 4B:
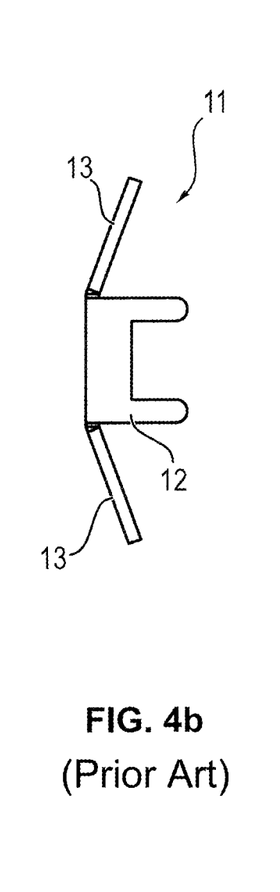
FIG. 4b shows a second view of a cover plate in accordance with the prior art in accordance with the prior art.
Figure 4C:
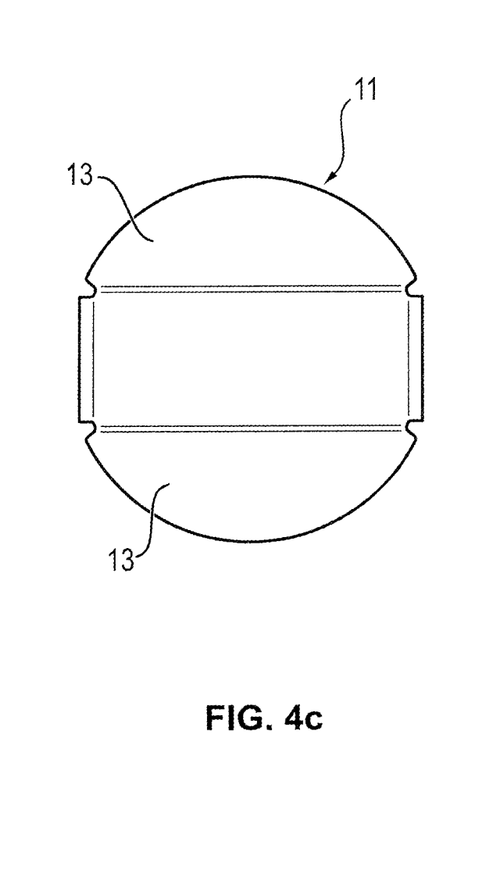
FIG. 4c shows a third view of a cover plate in accordance with the prior art in accordance with the prior art.

In order for the disc joint to be protected from, for example, soil or moisture, a cover plate 11 is interdisposed between the caster 6 and the saucer 9. One known prior art embodiment of a cover plate 11 in various views is illustrated in FIGS. 4a to 4c. The cover plate 11, together with the mounting plate 7 of the caster mount 3 and with the caster mount 3, encloses an intermediate space. Moreover, the cover plate 11 in particular also has two mutually opposite webs 12 which bear on the mounting plate 7 of the caster mount 3. The cover plate 11 on the webs 12 is connected to the caster mount 3 by a connector. Furthermore, the cover plate 11 additionally has wings 13 which are in each case configured in a crescent shape between the webs 12 and which are bent in the direction towards the intermediate space.

Preferably, the mounting plate 7 as a base area of the caster mount 3 is of round design. In particular, the saucer 9 is also configured so as to be round. Since the caster mount 3 and the saucer 9 (as a part which is fixedly connected to the support plate 2) are rotatable in relation to one another, the caster mount 3 having a round base area and correspondingly adapted internal components may be designed so as to be particularly compact. The support plate 2 may have any shape.

In order for the swivel caster 1 to be automatically aligned, the swivel caster exploits the fact that magnets with non-homonymous (opposite) magnetic poles attract one another and magnets with homonymous magnetic poles repel one another. The magnets which are poled homonymously or counter-homonymously here will preferably be disposed in the joint region 5 of the caster mount 3 and thus so as to be effectively close to the movable regions.

Figure 3A:
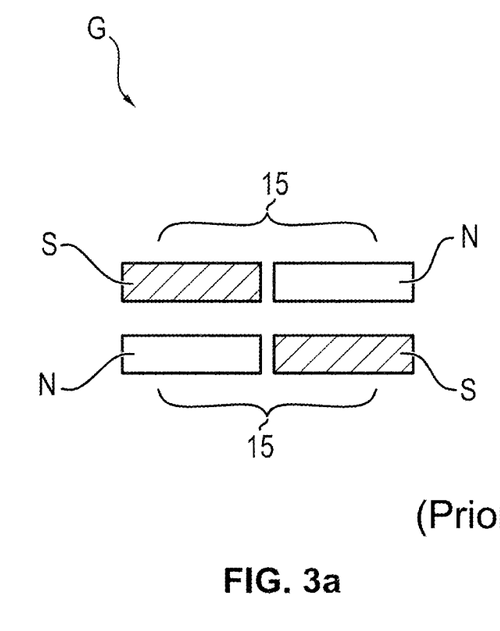
FIG. 3a shows a cross section through a magnet assembly in a first alignment in accordance with the prior art.

For example, a first double-pole magnet 15a having one north pole N and one south pole S may be provided on the saucer 9. Accordingly, the cover plate 11 of the caster mount 3, lying opposite and parallel with the vertical rotation axis V, could have a second magnet 15b having one north pole N and one south pole S. According to the invention, the magnets 15a, 15b lie so as to be mutually parallel and preferably extend perpendicularly to the vertical rotation axis V. Preferably, the first magnet 15a in basic alignment G of the caster mount 3 along the vertical rotation axis V has a north pole N and a south pole S in contact therewith, and the second magnet 15b adjoins along the vertical rotation axis V of the caster mount 3, having a north pole N and a south pole S in contact therewith. Alternatively, the first magnet 15a along the vertical rotation axis V may have a south pole S and a north pole N in contact therewith, and the second magnet 15b may adjoin along the vertical rotation axis V, having a south pole S and a north pole N in contact therewith. One potential assembly for magnets 15a, 15b in basic alignment G according to the prior art is shown in FIG. 3a.

In basic alignment G the north pole N of the magnet 15b of the saucer 9 attracts the south pole S of the magnet 15a of the cover plate 11, and the south pole S of the magnet 15b of the saucer 9, which lies next to the north pole N of the magnet 15b of the saucer 9, attracts the north pole N of the magnet 15a of the cover plate 11, which lies next to the south pole S of the magnet 15a on the cover plate 11. When the swivel caster 1 is moved out of basic alignment G, the magnetic fields of homonymous magnetic poles mutually overlap, so that the magnetic poles repel one another. In this way, the swivel caster 1 in relation to the support plate 2 always swings back to a single basic alignment G. In this basic alignment the caster 6 by way of its running surface is aligned in a specific alignment X. The swivel caster 1 here preferably swings in when the container having the swivel caster 1 is lifted and the swivel caster 1 consequently is free to move in the air.

In one potential embodiment of the invention, which is based on the principle which has been described above, a magnet 15b which has a north pole N and a south pole S is disposed on that side of the saucer 9 that faces the internal region of the caster mount 3. A magnet 15a which is attached to the cover plate 11 of the caster mount 3 lies opposite the magnet 15b of the saucer 9 of the support plate 2, so as to be parallel with the vertical rotation axis V. In particular, in basic alignment G of the swivel caster 1, in each case non-homonymous magnetic poles of the saucer 9 and of the caster mount 3 lie so as to be mutually opposite and parallel with the vertical rotation axis V. On account thereof it is achieved that the swivel caster 1 assumes a specific alignment, that is to say the basic alignment G.

Figure 3B:
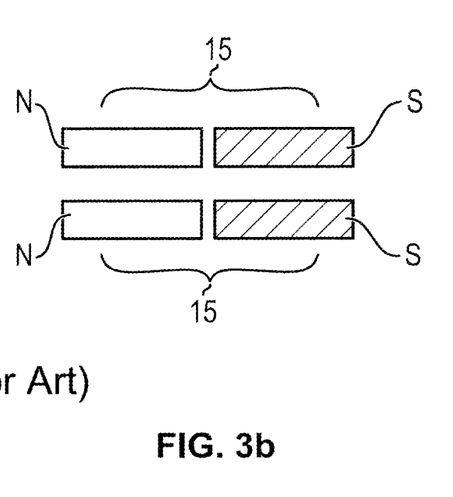
FIG. 3b shows a cross section through a magnet assembly in a second alignment in accordance with the prior art.

In particular, the magnets 15a, 15b are disposed and configured in such a manner that in basic alignment G they attract one another at maximum force and following rotation, in particular by 180° in a common plane, repel one another at maximum force. Alignment of the magnets 15a, 15b following rotation by 180° is schematically illustrated in prior art FIG. 3b. It may be advantageous here for each magnet 15a, 15b to have in each case two part-magnets. In particular, here a part-magnet of the first magnet 15a in basic alignment G along the vertical rotation axis V has a north pole N and a south pole S in contact therewith, adjoined along the vertical rotation axis V by a part-magnet of the second magnet 15b having a north pole N and a south pole S in contact therewith. Alternatively, a part-magnet of the first magnet 15a along the vertical rotation axis V has a south pole S and north pole N in contact therewith, adjoined along the vertical rotation axis V by a part-magnet of the second magnet 15b having a south pole S and a north pole N in contact therewith.

The part-magnets preferably form component parts of the magnets 15a, 15b, wherein at least in each case two part-magnets form a magnet 15a, 15b. Preferably, the two part-magnets of a magnet 15a, 15b are dissimilar magnetic poles. This means that each magnet is in each case formed from two part-magnets, wherein one part-magnet in relation to the other part-magnet is disposed so as to be rotationally offset by 180° about an axis which is perpendicular to the vertical rotation axis V.

Preferably, the magnets 15a, 15b and/or the part-magnets are disposed about the vertical rotation axis V so as to be point-symmetrical and/or mirror-symmetrical. In order for a torque to be configured about the vertical rotation axis V it may be advantageous for the part-magnets to be configured about the vertical rotation axis V so as to be asymmetrical. For example, the magnets 15a, 15b at the upper side thereof which in each case faces the other magnet 15a, 15b may be configured so as to be rectangular. Here, the part-magnets in a transverse manner to the vertical rotation axis V may have side lengths in such a manner that the latter, when placed against one another so as to be transverse to the vertical rotation axis V, form a cuboid having a square base area which extends in a transverse manner to the vertical rotation axis V. One exemplary embodiment of an arrangement of this type in accordance with the prior art is illustrated in FIG. 1.

The mount plate of the known swivel caster has two webs 12 which are disposed on the peripheries of the cover plate 11 bear on the mounting plate 7 of the caster mount 3, so as to expose the gap between the two magnets. Since the attraction force of a magnet 15a, 15b depends on the spacing from the magnet 15a, 15b, the degree of damping when swinging into the basic alignment G may be set by the configuration of the webs 12. The magnets 15a, 15b may comprise iron and/or nickel and/or neodymium.

Figure 5:
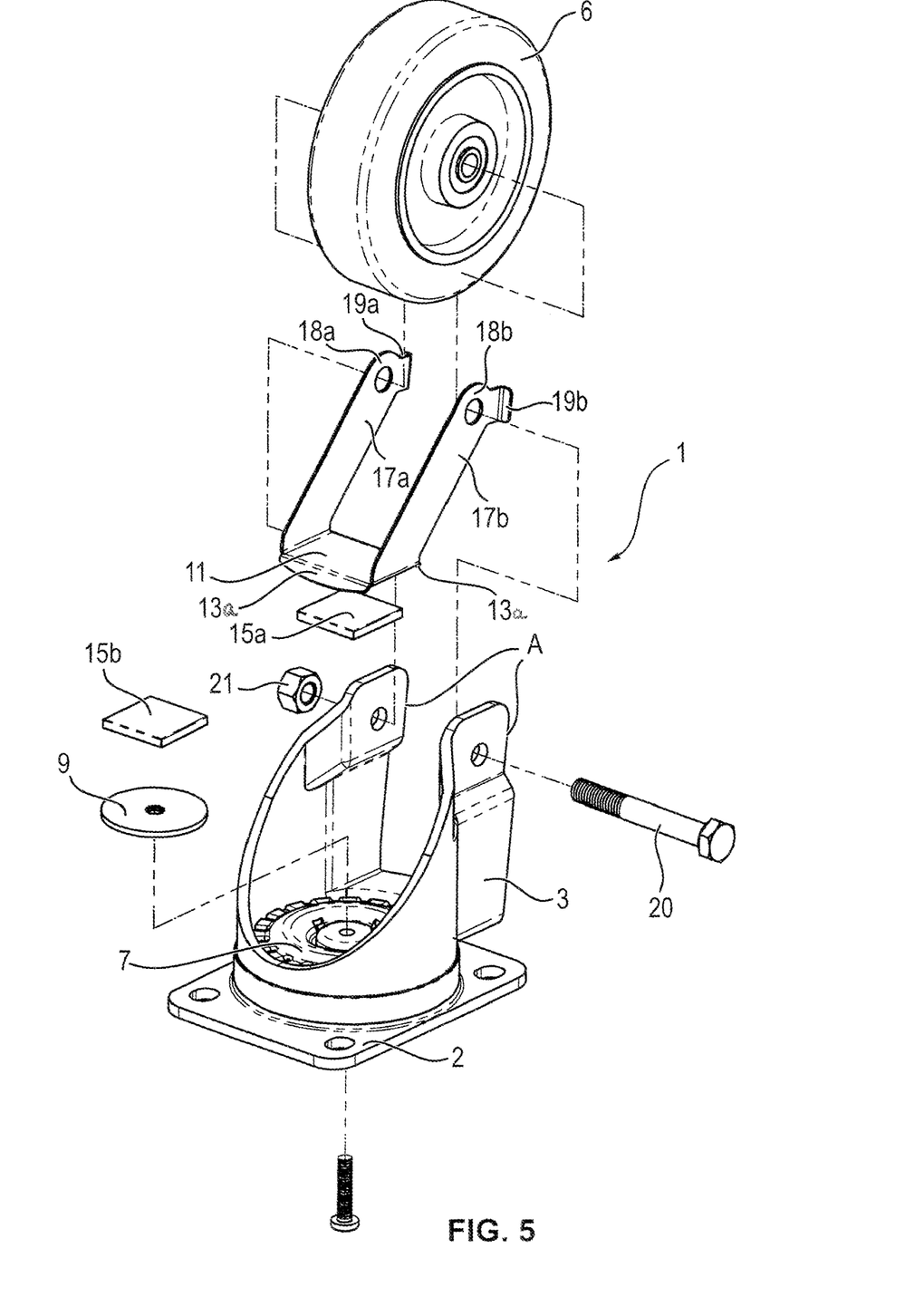
FIG. 5 shows an exploded view of a potential embodiment of a swivel caster according to the invention.

According to the invention, the cover plate 11 is provided with two legs 17a, 17b via which the cover plate 11 is connected to the caster mount 3 in such a manner that the cover plate 11 is held so as to be non-movable on the caster mount 3. A corresponding embodiment of the swivel caster 1 is illustrated in FIG. 5. The two legs 17a, 17b extend in the direction towards the horizontal rotation axis H of the caster 6 and by way of the free end 18a, 18b thereof which is remote from the cover plate 11 are in each case connected to the caster mount 3. The cover plate 11 and the legs 17a, 17b are preferably configured so as to be integral. In particular, the legs 17a, 17b run in a mutually parallel manner.

In particular, the cover plate 11 by their legs 17a, 17b, at the free ends 18a, 18b thereof which are remote from the former, together with the caster 6 is connected to the caster mount 3 via a common connector. For example, the legs 17a, 17b of the cover plate 11, by way of the free ends 18a, 18b thereof, may extend into an intermediate space between the caster 6, in the region of the rotation axis H thereof, and the caster mount 3. In the region of the horizontal rotation axis H, on the free ends 18a, 18b of the legs 17a, 17b and on the caster mount 3, there are then, for example, clearances through which the connector runs along the horizontal rotation axis H of the caster 6 from the caster mount 3 through a respective free end 18a, 18b of the legs 17a, 17b, and through the caster 6. Particularly preferably, the connector forms an axle for the caster 6 and is preferably configured in the form of a screw 20 which is secured by a fastener, for example a nut 21, against displacement in the caster mount 3 along the horizontal rotation axis H. The cover plate 11 via this exemplary connector is connected to the caster mount 3 so as to be rotatable in relation to the horizontal rotation axis H.

In addition to the connector, the legs 17a, 17b are in particular connected to the caster mount 3 so as to be rotationally fixed in relation to the horizontal rotation axis H. For example, the free ends 18a, 18b of the legs 17a, 17b may in each case be connected to a lug 19a, 19b which is bent away at least at a right angle from the respective free end 18a, 18b of the legs 17a, 17b, wherein the respective lug 19a, 19b runs so as to be tangential to the horizontal rotation axis H of the caster 6 and points away from the caster 6. Preferably, the contact side A of the caster mount 3 extends so as to be tangential to the horizontal rotation axis H in the same direction as the respective lug 19a, 19b which is placed against the contact side A. There is thus a form-fit by virtue of contact between the lugs 19a, 19b and the contact sides A of the caster mount 3, so that the cover plate 11 cannot be rotated about the horizontal rotation axis H of the casters 6.

In particular, the first magnet 15a is moved relative to the second magnet 15b a guide of the cover plate 11 and can be fastened immovably to the cover plate 11 by fastener 26 of the guide. According to a preferred embodiment, the first magnet 15a, being connected to the cover plate 11, can be rotated about the vertical axis V.

Figure 7A:
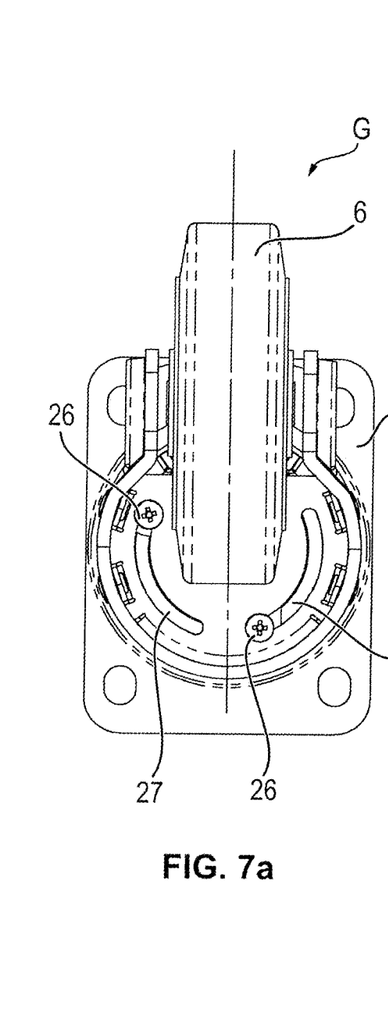
FIG. 7a shows a view on a swivel caster in the basic alignment.
Figures 7B, 7C:
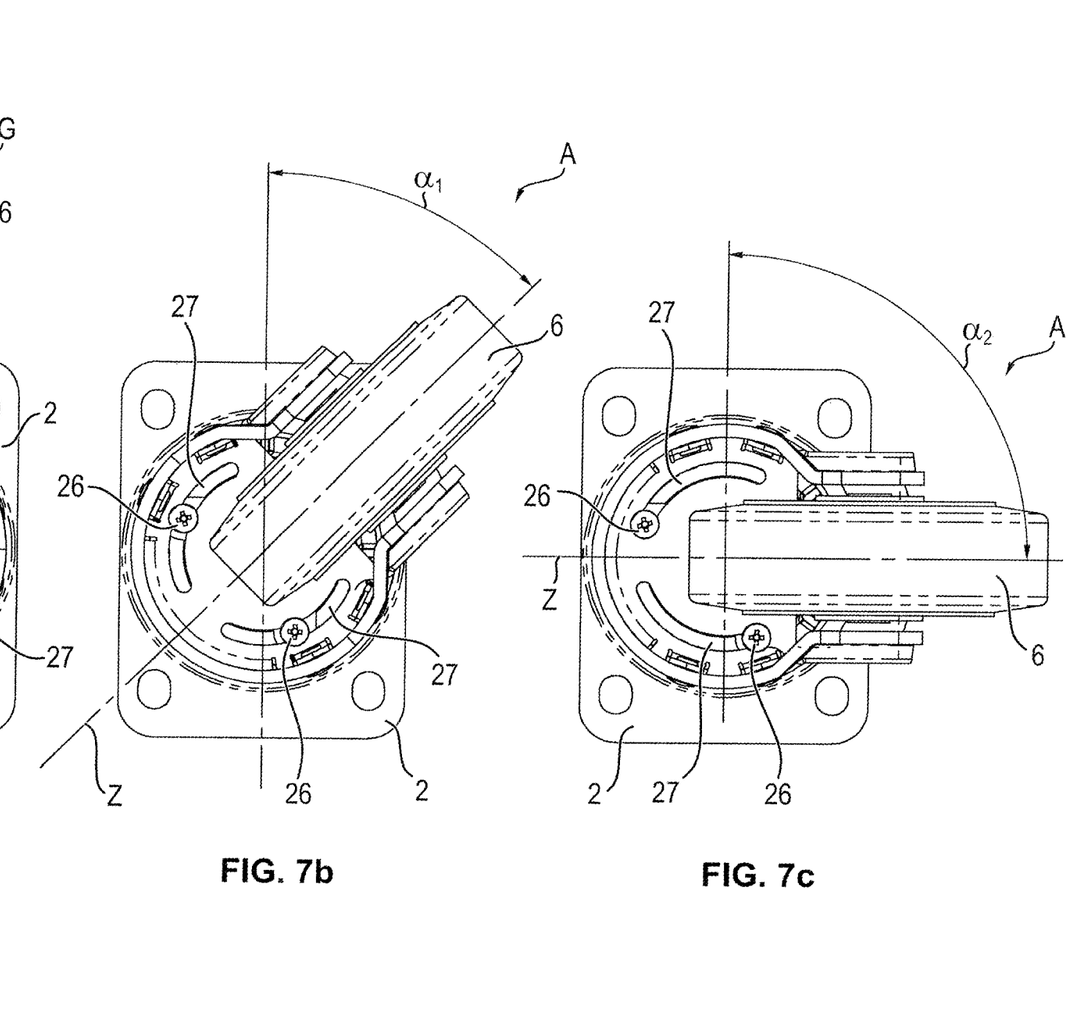
FIG. 7b shows a view on a swivel-caster in a first adjusted basic alignment.
FIG. 7c shows a view on a swivel caster in a second adjusted basic alignment.

Guide of the cover plate 11 allow the caster 6 to have an adjusted basic alignment A which can be modified flexibly. The adjusted basic alignment A is set by releasing the first magnet 15a from the cover plate 11, rotating the magnet 15a about the vertical axis V in a range which is predefined by the guide and fastening the first magnet 15a immovably to the cover plate 11 by the fastening means 26 of the guide. According to exemplary embodiments, which are shown in the FIGS. 7a to 7c, the adjusted basic alignment A can be set in a range from 0 to 90 degrees relative to the basic alignment G. E. g., FIG. 7a shows the caster 6 being in the basic alignment G so that the adjusted basic alignment A corresponds to the basic alignment G. Furthermore, FIG. 7b shows the caster 6 being in an adjusted basic alignment A with an angle of α1=45 degrees relative to the basic alignment G and FIG. 7c shows the caster 6 being in an adjusted basic alignment A with an angle of α2=90 degrees relative to the basic alignment G. An adjusted basic alignment A allows the swivel caster 1 of a transport container, to which the swivel caster 1 is attached, to be included in a clearance of another container being directed arbitrarily.

Particularly, the first magnet 15a is held in a holder 25, where the holder 25 is guided in the guide of the cover plate 11. Preferably, the holder 25 is connected to the guiding means in at least two sections. According to the most preferred embodiment, the holder 25 is held in just two sections in the guiding means of the cover plate 11. Preferably, the holder 25 fixes the first magnet 15a in a form fitting manner against movements along the vertical axis V. Especially, it fixes the first magnet 15a against movements in the direction of the second magnet 15b.

Figure 6:
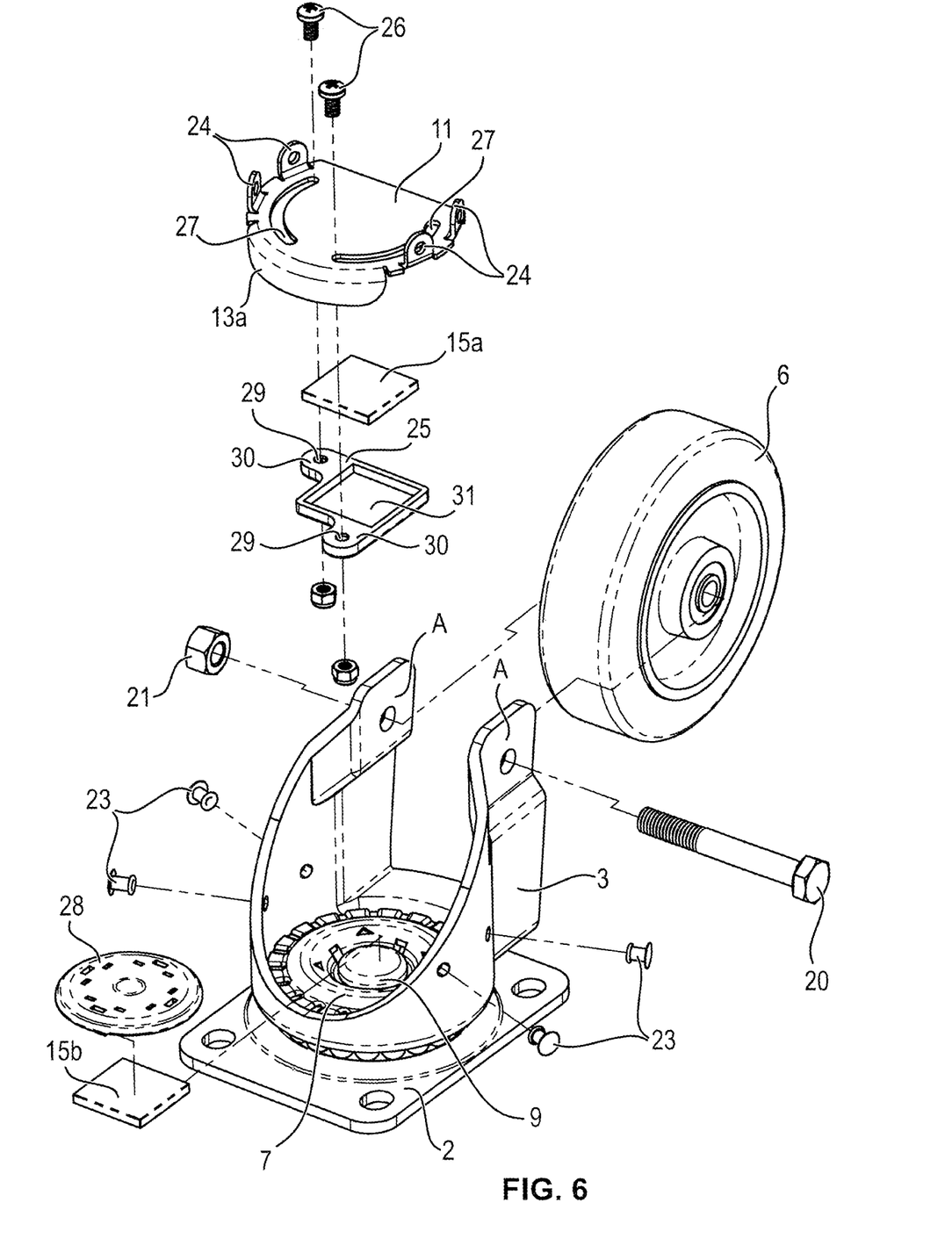
FIG. 6 shows an exploded view of a further potential embodiment of a swivel caster according to the invention.

According to a possible embodiment of the holder 25, which is shown in FIG. 6, the holder 25 consists of a container 31 which includes the first magnet 15a. In the circumference of the vertical axis V, the container 31 has two extensions 30 which each have an aperture 29 extending parallel to the vertical axis V through each extension 30. The holder 25 is connected to the guide by the fastener 26, such as screws, which extend through the guide of the cover plate 11 and the apertures 29. If necessary, the fastener 26 can be secured. E. g., if the fastener 26 are screws, they can be secured by nuts which are mounted on the screws so that they abut against the holder 25. If the nuts are released, the holder can be moved about the vertical axis V. If the nuts are tightened, the holder 25 is connected immovably to the cover plate 11.

The guide is, according to a possible embodiment, slots 27 which extend within the cover plate 11 along a circumferential circle of the vertical axis V. Preferably, the guide includes two slots 27 which extend along the circumferential circle of the vertical axis V about a length which corresponds to an angle from 60 to 130 degrees of the circumferential circle of the vertical axis V. In particular, the slots 27 are arranged in mirror symmetry relative to a central axis Z extending centrically in the direction of the wheel tread of the caster 6 in the basic alignment G. For example, as shown in FIG. 7b, each slot 30 extends about a length along the circumferential circle of the vertical axis V which corresponds to an angle of about 90 degrees.

The interior between the cover plate 11 and the saucer 9, which includes the two magnets 15a, 15b, is preferably protected by a fold 13a, which points towards the second magnet 15b. Furthermore, the second magnet 15b particularly is completely covered by a spacer 28 which is formed like a disc. The spacer 28 provides space between the first magnet 15a and the second magnet 15b so that the first magnet 15a is not magnetically attached to the second magnet 15b when the first magnet 15a is moved relative to the second magnet 15b in the guide of the cover plate 11. Additionally, the second magnet 15a is protected by the spacer 28. Preferably, the spacer 28 is made of plastic. It can have several openings which are placed on a circumferential circle of the vertical axis V in the spacer 28.

As shown in FIG. 6, the cover plate 11 can be mounted in the caster mount 3, e. g. by screws or rivets 23 which extend through straps 24 of the cover plate 11 and through openings of the caster mount.

According to the invention, a stop for the swivel caster 1 is furthermore provided. The caster mount may here be connected to the stop, for example. The stop includes a blocking element which in a blocked position interacts in a form-fitting and/or force-fitting manner with a caster 6 and with the disc joint which connects the caster mount 3 and the support plate 2 so as to be rotatable about the vertical rotation axis V, and in an unblocked position releases the caster 6 and the disc joint. In particular, the stop is configured in a tripartite manner and includes a cap which is moulded on the caster mount and extends along a part-region of the caster running wheel which corresponds to a part-radius of the caster 6, and furthermore includes a lever which is guided in a cap clearance, and the movable blocking element which is connected to the lever and which is configured as an elastic angular piece. The angular piece is thus actuatable by way of the lever.

In particular, the elastic angular piece extends along the cap. The angular piece in the blocked position between a tilting axis of the actuating lever and the actuating lever is preferably jammed in such a manner that the angular piece, on the one hand, interacts in a force-fitting and/or form-fitting manner with the mounting plate of the caster 6 and, on the other hand, interacts in a form-fitting and/or force-fitting manner with the caster 6. The tilting axis may be formed by a pin which connected to the cap, for example, wherein the tilting axis extends so as to be transverse to a line of movement of the running surface. In particular, the angular piece has an elastic finger which in the blocked position by way of a rectangular finger tip pushes onto the running surface of the caster. A lug which engages in a clearance of the lever is configured so as to be opposite the finger tip at the end side of an extension of the finger. The lever and the lug in this way form an articulation joint.

Furthermore preferably, the cover plate 11 is configured in such a manner that the latter exposes a region of the mounting plate 7 which in the blocked position interacts with the stop in a force-fitting manner.

The invention is not limited to the illustrated and described exemplary embodiments, but also includes all embodiments which in the context of the invention have a similar effect. It is explicitly stressed that the exemplary embodiments are not limited to all features in combination; rather, each single part-feature may also be individually relevant to the invention, when detached from all other part-features. Furthermore, the invention to date is also not yet limited to the combination of features herein, but may be defined by any other arbitrary combination of specific features of all disclosed individual features in total. This means that in principle practically every individual feature described in a principal embodiment may be omitted or be substituted by at least one individual feature which has been mentioned in any other passage of the application, respectively.

While the above description constitutes the preferred embodiment of the present invention, it will be appreciated that the invention is susceptible to modification, variation and change without departing from the proper scope and fair meaning of the accompanying claims.

The invention claimed is:

1. A swivel caster for connection to a transport container comprising,
a support plate,
a caster mount having a caster which is rotatable about a horizontal rotation axis, wherein the caster mount is connected to the support plate so as to be rotatable about a vertical rotation axis,
at least one first magnet connected to the caster mount and at least one second magnet connected to the support plate, wherein the first and second magnets are magnetized and disposed so as to be mutually parallel forming a gap in such a manner that in an alignment of the caster mount outside a defined basic alignment of the caster mount the first and second magnets interact in such a manner that the caster mount swings into the basic alignment, wherein the caster mount has a cover plate which collectively with a saucer of the support plate encloses an intermediate space for the first and the second magnets,
the cover plate is connected with the caster mount,
the first magnet is mounted movably to the cover plate by a magnet container, and a first fastener which fixes the first magnet relative to the cover plate and holds the first magnet movably relative to the second magnet.

2. A swivel caster according to claim 1 further comprising, the first and second magnets are disposed in relation to one another and configured in such a manner that the first and second magnets in the basic alignment of the caster mount in the vertical rotation axis attract one another at a first maximum force and following at least a partial rotation, in a common plane, repel one another at a second maximum force.

3. A swivel caster according to claim 1 further comprising, the first and second magnets extend so as to be perpendicular to the vertical rotation axis of the caster mount.

4. A swivel caster according to claim 1 further comprising, in the basic alignment of the caster mount the first magnet on a side thereof that faces the second magnet and extends so as to be transverse to the vertical rotation axis of the caster mount has a north pole and a south pole in contact therewith, and the second magnet on a face thereof that faces the first magnet and extends so as to be transverse to the vertical rotation axis has a north pole, which is parallel with the vertical rotation axis and opposite to the south pole of the first magnet, and a south pole which is parallel with the vertical rotation axis and opposite the north pole of the first magnet.

5. A swivel caster according to claim 1 comprising, each of the first and second magnets are formed from two part-magnets which are disposed beside one another so as to be perpendicular to the vertical rotation axis, wherein the disposal of a north pole and of a south pole of the part-magnets extends in the direction of the vertical rotation axis, and that a first part-magnet in relation to a second part-magnet is disposed so as to be rotationally offset by 180° about an axis which is perpendicular to the vertical rotation axis.

6. A swivel caster according to claim 1 further comprising, the first and second magnets are disposed about the vertical rotation axis so as to be point-symmetrical and or mirror-symmetrical.

7. A swivel caster according to claim 1 further comprising the support plate is connected to the saucer, and a mounting plate forms a base area of the caster mount, wherein the mounting plate is rotatably mounted between the saucer and the support plate.

8. A swivel caster according to claim 1 further comprising, the first magnet is disposed on a side of the cover plate that faces the intermediate space, and the second magnet is disposed on a side of the saucer of the support plate that faces the intermediate space.

9. A swivel caster according claim 1 further comprising, the first magnet is fixable by the first fastener to the cover plate.

10. A swivel caster according to claim 1 further comprising, the first magnet is mounted movably to the cover plate and can be moved in the circumferential direction of the vertical axis relative to the cover plate.

11. A swivel caster according to claim 1 further comprising, the magnet container retaining the first magnet in a form fitting manner and the magnet container is connected in at least two sections to the the cover plate.

12. A swivel caster according to claim 11 further comprising, the cover plate forms two slots which extend within the cover plate along a section of a circumferential circle of the vertical axis, and further comprising two of the first fasteners each of the first fasteners passing through one of the two slots for fixing the magnet container and the first magnet relative to the cover plate in a rotated position.

13. A swivel caster according to claim 12 further comprising, the at least two sections in the form of at least two extensions each having a bore which receives one of the two first fasteners passing through the slots of the cover plate affixing the magnet container to the cover plate.

14. A swivel caster according to claim 1 further comprising, the cover plate is affixed to the caster mount by a second fastener extending through one or more straps of the cover plate and through openings of the caster mount.

* * * * *